United States Patent

Eisenberg

[11] Patent Number: 5,970,503
[45] Date of Patent: Oct. 19, 1999

[54] METHOD FOR ONLINE REVISION CONTROL

[75] Inventor: Alan J. Eisenberg, Monmouth Junction, N.J.

[73] Assignee: Base Ten Systems, Inc., Trenton, N.J.

[21] Appl. No.: 08/660,945

[22] Filed: Jun. 12, 1996

[51] Int. Cl.$^6$ .................................................. G06F 17/30
[52] U.S. Cl. ............................................................... 707/203
[58] Field of Search ................................. 395/616, 619, 395/618; 707/203

[56] References Cited

U.S. PATENT DOCUMENTS

| | | | |
|---|---|---|---|
| 4,558,413 | 12/1985 | Schmidt et al. | 707/203 |
| 4,646,229 | 2/1987 | Boyle | 707/203 |
| 5,191,534 | 3/1993 | Orr et al. | 364/468 |
| 5,278,979 | 1/1994 | Foster et al. | 707/203 |
| 5,586,313 | 12/1996 | Schnittker et al. | 395/615 |

*Primary Examiner*—Thomas G. Black
*Assistant Examiner*—Charles L. Rones
*Attorney, Agent, or Firm*—Sprung Kramer Schaefer & Briscoe

[57] ABSTRACT

A method for controlling a database comprises storing field definitions defining a version of the database, storing an effectivity table including descriptors corresponding to the versions and field definitions and an effective date for each and storing records with data for the fields along with a date when the record was created. When the version of the database is changed, only revised field definitions are stored and the stored effectivity table is updated only with changes in a state of field definitions and/or version changes and the effective date thereof.

9 Claims, 6 Drawing Sheets

FIG. 1

DATABASE 11

| DEFINITION FOR ITEM F1.1 |

| DEFINITION FOR ITEM F5.2 |
| EFFECTIVITY TABLE |

FIG. 3

DATABASE 11

| | FIELD AX | FIELD BX | FIELD CX | FIELD DX | FIELD EX | FIELD FX | CREATION DATE |
|---|---|---|---|---|---|---|---|
| RECORD1 | DATA | DATA | DATA | DATA | DATA | DATA | DATE |
| . | . | | | | | | |
| . | . | | | | | | |
| . | . | | | | | | |
| RECORDN | DATA | DATA | DATA | DATA | DATA | DATA | DATE |

| DEFINITION FOR FIELD A |
|---|
| DEFINITION FOR FIELD B |

| DEFINITION FOR FIELD F |
|---|
| DEFINITION FOR FIELD A1 |
| DEFINITION FOR FIELD A2 |
| DEFINITION FOR FIELD B1 |

| DEFINITION FOR FIELD F3 |
|---|
| EFFECTIVITY TABLE |

METHOD FOR ONLINE REVISION CONTROL

BACKGROUND OF THE INVENTION

The present invention relates to a manufacturing execution system and, more specifically, to the versioning or revision control of the system database and electronic batch records.

Manufacturing execution systems, which control the manufacture of food products, pharmaceuticals, mechanical and electronic equipment, chemical compositions, etc., generally maintain a database of information which controls and supports the production process. These systems also record event data relating to particular events in the manufacturing process and support data.

The support data comprises numerous records, each of which having a plurality of fields in which data is stored. From time to time in such a system, it is necessary to revise the internal definitions that are used for the fields of the support data, although the external appearance to the user may be unchanged. Each time the internal definitions of data fields are changed, this results in a new version of the database.

In prior systems, if a change was made to information relating previous activities to the previous version of information, this event was recorded in a chronological log, and then the change was applied to the database causing a new modified version of the database to exist. Additionally, the state of the information database as it appears when the event occurs, if it was required to be available with associated events (such as production operation), would require storing the appearance of all pertinent data with the record, thus causing the environment to be stored with each record. This is cumbersome and impractical. Since pertinent data cannot always be identified at the time the event is stored, since after the fact auditing may require information that was not anticipated at the time of the first occurrence, all data might have to be stored or referenced at the time of storing, and a recreation of the database from this stored data would be required. This would be long and laborious.

SUMMARY OF THE INVENTION

The main object of the present invention is to provide a method for the online revision control of the database to give the system the ability to permit modifications to information used for controlling and monitoring a manufacturing process while still being able to easily recreate the environment that existed when a specific product was manufactured when a specific action was performed.

A key feature of the present invention is to not have to construct a list of all items associated with any version of the environment, but rather, to minimize the number of records within the database so that sufficient information is available to reconstruct the total environment at any instance in time.

Another object of the present invention is a method which allows previous versions of the database to be reapplied, for example, summer and winter hours being alternately made effective, thereby giving traceability to when the discontinuous times each of the versions was active.

The version control of database records along with the effectivity control according to the present invention will permit the association of information and its exact appearance to its use. Specific information has an internal definition of use while having an external appearance to the user. The system according to the present invention is able to associate the internal use with data as well as through effectivity control to define the user appearance at the time of a specific occurrence.

The system only requires revised fields, which define a new version, to be stored along with entries in an effectivity table. If a previous version is to be used, then only version entries in the effectivity table need be added.

Another object of the present invention is to provide list control which is able to identify the correlation of item usage with the entire list itself.

One advantage of the present invention is that the environment at any instant can be reconstructed through the correlation of different versions of elements of the database along with the effectivity control information. This is extended to lists of elements to be able to reconstruct all members of the list at any instant.

The method in accordance with the present invention is useful in critical or regulated processes where the ability to reconstruct the entire environment which also includes that part of the environment of interest quickly at any point in time in order to prove proper operation is essential.

In accordance with the invention, when an existing field is modified, this generates a new field closely linked to the first on previous records, but with a new version.

Since the user will only have one version actively being used for new inputs, but all versions might have been used in the past, there are records in the system which define their active field as a previous version. Also the actual effectivity of the field might shift between versions.

If viewed on a time line allowing one to know when a specific version was effective, particularly if there is a disjointed use of changeable field definitions, a subsidiary effectivity table along with all records which use the information identifies the data and its version and will allow reconstruction of the environment at any instant in time. For lists of data, a structure using headers and list entries will allow recreation of the list at any instant while permitting complete correlation of entries from the alternatives of the list.

These and other features of the present invention are achieved in accordance with the present invention by the method according to the present invention comprising storing field definitions to define a version of a database, storing an effectivity table including a descriptor for each version (corresponding to a consistent set of fields) or field definition and the effective date therefor, storing records with data for the fields along with a date when the record was created, changing the version of the database, thereafter storing only revised field definitions and updating the stored effectivity table only with changes in a state of field definitions and version changes and an effectivity date therefor. The act of storing records can be repeated as many times as is desired. The version of the database can be thereafter optionally changed along with the storing of revised field definitions and updates to the effectivity table. The database version is reconstructed for a given record by obtaining the creation date of the given record, searching the stored effectivity table to determine the active version and the active fields of the database when the given record was created, and obtaining the stored active field definitions. All records referred by the given record also contain a version definition within the given record in order to get an immediate correlation of the given record and its ancillary data. As a result, even if the database has a different version of the ancillary record, this given record is intrinsically tied to the version that existed at the time the given record was created.

Where at least one of the fields is a list field comprising a list of items each having a definition, the method further comprises storing item definitions defining a header version of the list field and storing a second effectivity table for the list. When the version of the list field is changed, only revised item definitions are stored along with a revised header and the second effectivity table is updated with only changes in state and header versions and the effective dates thereof. The list field is reconstructed for a given record by obtaining the creation date of the given record, using the creation date to search the second effectivity table for the active header and the active items at the time the record was created and obtaining the stored active item definitions.

These and other features of the present invention are described in more detail with regard to the attached drawings, wherein:

DETAILED DESCRIPTION OF THE INVENTION

Figure 1:
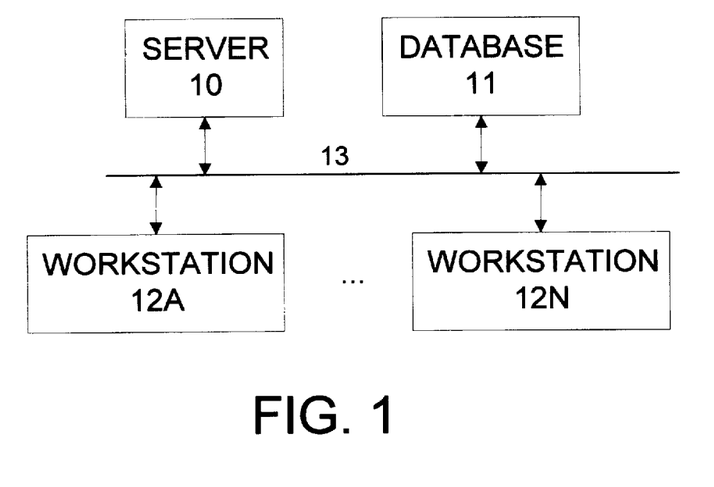
FIG. 1 is a block diagram of a manufacturing execution system using the method according to the present invention.

In a manufacturing execution system such as the one shown in FIG. 1, various workstations 12A–12N are distributed throughout the production system and control various functions of the manufacturing execution system, such as receiving and inventory management, dispensing, quality control, scheduling, resource management, equipment management, human resources management, security, production positions, waste management and facility and equipment monitoring and control. Data from each of the workstations 12A–12N is stored in the database 11 under the control of a server 10 all communicating over a central bus 13.

The database 11 can be stored in a memory which can be an optical memory, a semiconductor memory, a magnetic memory or other conventional memories that are presently available. The server and workstations are preferably microcomputers, such as those using the Pentium microprocessor or the Power PC processor.

In the manufacturing execution system, data is entered at each workstation under the control of the system software and user defined rules for each data field that will be stored in records in the database 11. These user defined rules will change from time to time, and each time there is a change, the version of the database is changed.

For example, for the production of a pharmaceutical composition, a master production control record must be defined which includes a recipe of the materials, steps, people and equipment needed for the manufacturing process. The various fields for the master production control record for each item to be manufactured would include an identification number for the record, an identification number for the item to be produced, the batch size, a list of components to use, a list of processes to perform, a description of each step of production, controls to be made, the identification of the operator, a list of qualifications for each step of production, how the product is to be handled, the labeling for the product, operating procedures for sampling, testing and production. Also included are a list of approved suppliers for each material used in the batch, the equipment to be used during production and the persons qualified for operating that equipment. The field may also include a label format for the item being produced having a particular appearance and data areas thereon.

Figure 2:
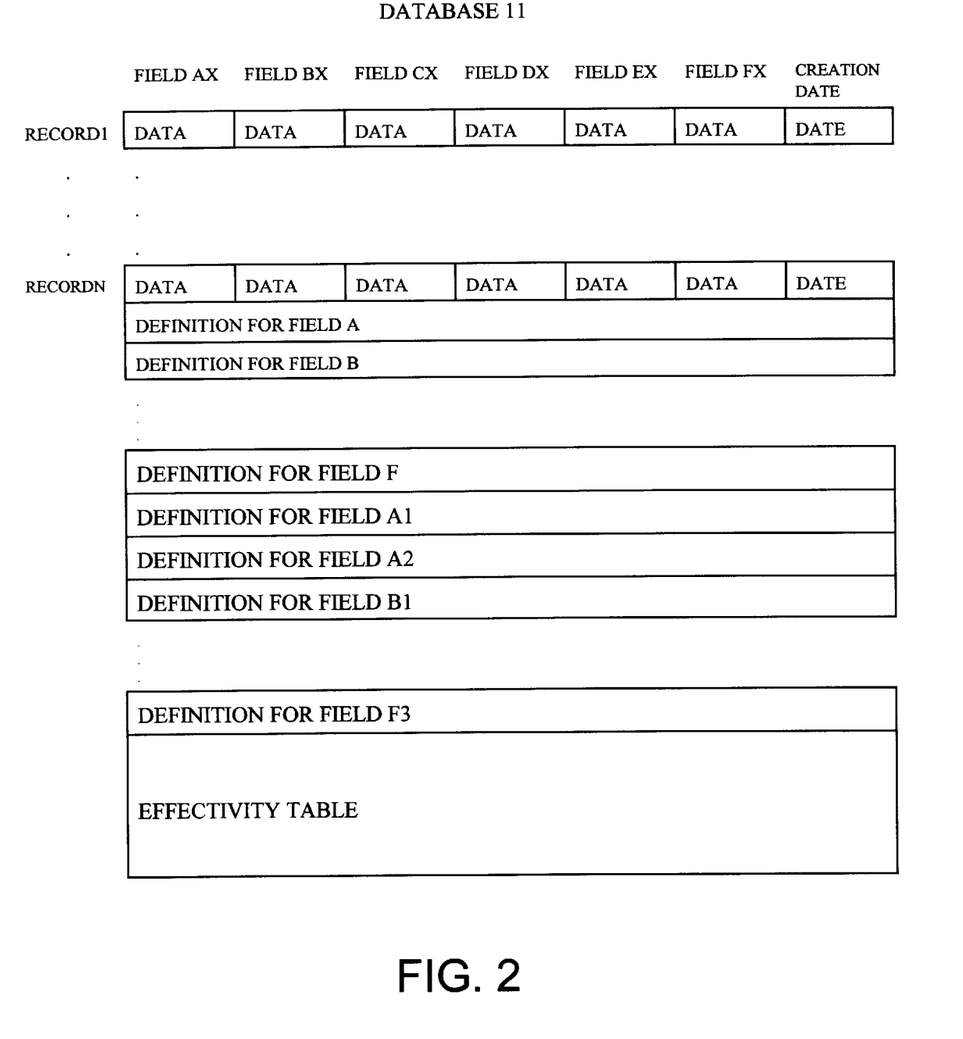
FIG. 2 shows the database of FIG. 1 in accordance with the present invention.

As shown in Table I, for the sake of clarity, the master production control record is shown to include six fields A–F. It is understood that more or less fields can be used. These definitions are stored in the database 11, as shown in FIG. 2.

As is also shown in Table I, at different times T1–T8, the field definitions are changed. Thus, the revision of field definitions of fields A, B, E and F result in revised fields A1, B1 and E1 which are effective at time T2. These changes become version V2 of the database.

For example, fields A–F relate to a starting material used in a process and define the material by its normal expiration time, its name, whether or not it is an active ingredient, its material code, the unit of measure used, and the supplier, respectively. Thus, in version 2 of the database, the normal expiration for the material would be changed from six months to nine months, the name of the material would be changed, and the unit of measure would change from kilograms to pounds.

At time T3, a third version V3 of the database is created by the change in field A to A2 and the change in field E1 back to the previous definition version E and the change of field F to F1. Version 4, which is created at

TABLE I

| T1 | T2 | T3 | T4 | T5 | T6 | T7 | T8 |
|----|----|----|----|----|----|----|----|
| V1 | V2 | V3 | V4 | V2 | V1 | V4 | V5 |
| A  | A1 | A2 | A2 | A1 | A  | A2 | A2 |
| B  | B1 | B1 | B2 | B1 | B  | B2 | B1 |
| C  | C  | C  | C1 | C  | C  | C1 | C  |
| D  | D  | D  | D  | D  | D  | D  | D  |
| E  | E1 | E  | E1 | E1 | E  | E1 | E  |
| F  | F  | F1 | F2 | F  | F  | F2 | F3 |

TABLE II

| A  | T1 |
|----|----|
| B  | T1 |
| C  | T1 |
| D  | T1 |
| E  | T1 |
| F  | T1 |
| V1 | T1 |
| A1 | T2 |
| B1 | T2 |
| E1 | T2 |
| V2 | T2 |
| A2 | T3 |
| E  | T3 |
| F1 | T3 |
| V3 | T3 |
| B2 | T4 |
| C1 | T4 |
| E1 | T4 |
| F2 | T4 |
| V4 | T4 |
| V2 | T5 |
| V1 | T6 |
| V4 | T7 |
| B1 | T8 |
| C  | T8 |
| E  | T8 |
| F3 | T8 |
| V5 | T8 | time T4, involves the change of B1 to B2, C to C1, E to E1 and F1 to F2.

At some time in the future at T5, it is desirable to again use version V2 of the database to create records and likewise at time T6, version V1 is used, at time T7, version V4 is used and at time T8, a new version V5 is created.

Each time a field definition is revised, the definition is stored in database 11 as is shown in FIG. 2. When a previously created field definition is used, there is no need to store its definition, because it is already in the database.

In accordance with the invention, the database 11 also stores an effectivity table, the data for which is shown in Table II. In this table, the system stores a descriptor for each field definition and version and the effective dates for each. Thus, the initial entries in the table include A–F, V1 and their effective date T1.

At time T2, there is a change of state of A to A1, B to B1, E to E1 and a change in version of V1 to V2, and the effective date of each is T2. The effectivity table is updated with this information, as shown in Table II. When the user returns to a previous version, as in the case of going to version V2 at T5, since the active fields for version V2 can be obtained from the change of state information already in the table, the system only has to store the descriptor V2 with effective date T5.

Table II is a chronological ordering sorted by each element in time, though database 11 memory can keep the listing in any suitable order. This table thus defines the effectivity of each change associated with each record and is an active indication which defines the current active version and active element of each field. This active indication and the effectiveness entries completely define the state of the system at any time.

Thus, while version V1 of the database may have been created at time T1, it is effective during the time period from T1 to T2 and during the period from time T6 to T7. If a record created at some time TX which was between times T6 and T7, one need only look at the entries in Table II stored in database 11 to determine that the active field definitions at that instant in time were A, B, C, D, E, F.

Thus, aside from the definitions for each of the fields and their revisions, all that one needs to store in memory in order to completely reconstruct the state of the machine at any given time is the effectivity Table II.

As further changes are made to the fields, the new definitions are stored in memory and entries are added into the effectivity table stored in memory.

When data is stored in the database, such as in records 1–N, the record includes the data for the various fields, as well as the date that the record was created.

In order to then recreate the state of the system at the time that the record was created, the system searches the effectivity table stored in the database memory to see which version and which field definitions were active at that instant in time and then obtains those field definitions which are already stored in memory. This information enables the environment to be totally reconstructed.

When a field is a list field, such as field F in Table I, the list can be controlled in a manner similar to that of the database versioning control.

As shown in Table III, the list field F has a header version H1 associated with it at time T1, and each element of the list 1–5 is given a header number, so that the elements of the list are numbered F1.1–F5.1.

At each time T2–T8, if the definition for a particular list item is changed to create the list versions F, F1, F2 and F3 shown in Table I, the system need only store the definitions for the various items F1.1–F5.2, as well as an effectivity table shown in Table IV. Additionally, the effectivity table will contain the effective time of each of the header versions themselves. Thus, if an item changes, we know the effective time of the

TABLE III

| T1 | T2 | T3 | T4 | T5 | T6 | T7 | T8 |
|----|----|----|----|----|----|----|----|
| H1 | H1 | H2 | H3 | H1 | H1 | H3 | H4 |
| F1.1 | F1.1 | F1.1 | F1.1 | F1.1 | F1.1 | F1.1 | F1.2 |
| F2.1 | F2.1 | F2.1 | F2.1 | F2.1 | F2.1 | F2.1 | F2.1 |
| F3.1 | F3.1 | F3.1 | F3.2 | F3.1 | F3.1 | F3.2 | F3.1 |
| F4.1 | F4.1 | F4.2 | F4.2 | F4.1 | F4.1 | F4.2 | F4.2 |
| F5.1 | F5.1 | F5.2 | F5.2 | F5.1 | F5.1 | F5.2 | F5.2 |

TABLE IV

| | |
|---|---|
| F1.1 | T1 |
| F2.1 | T1 |
| F3.1 | T1 |
| F4.1 | T1 |
| F5.1 | T1 |
| H1 | T1 |
| F4.2 | T3 |
| F5.2 | T3 |
| H2 | T3 |
| F3.2 | T4 |
| H3 | T4 |
| H1 | T5 |
| H3 | T7 |
| F1.2 | T8 |
| F3.1 | T8 |
| H4 | T8 | new item, and if the whole list changes, then we know the effective time of the list.

Table IV indicates each change of header version and change of state of a list item and the time at which it became effective. Thus, field F, for example, a list of approved suppliers, is changed to version 2, corresponding to F1, when a particular supplier is temporarily not approved, or changes to form version 3 (F2) when a supplier is temporarily added. This would correspond to the changes of F4.1 and F4.2 and F5.1 and F5.2. By storing the times at which changes in state became effective, the list of items for any particular header can be recreated from the stored effectivity table when the creation date of a record is known.

If at a later time the list is again changed to a previous version, then the header version member need only be stored, such as H1 at T5. If a new version of the list is created, the new list item definitions are stored along with the version number and the effective date thereof, such as the version H4 at T8.

Figure 4:
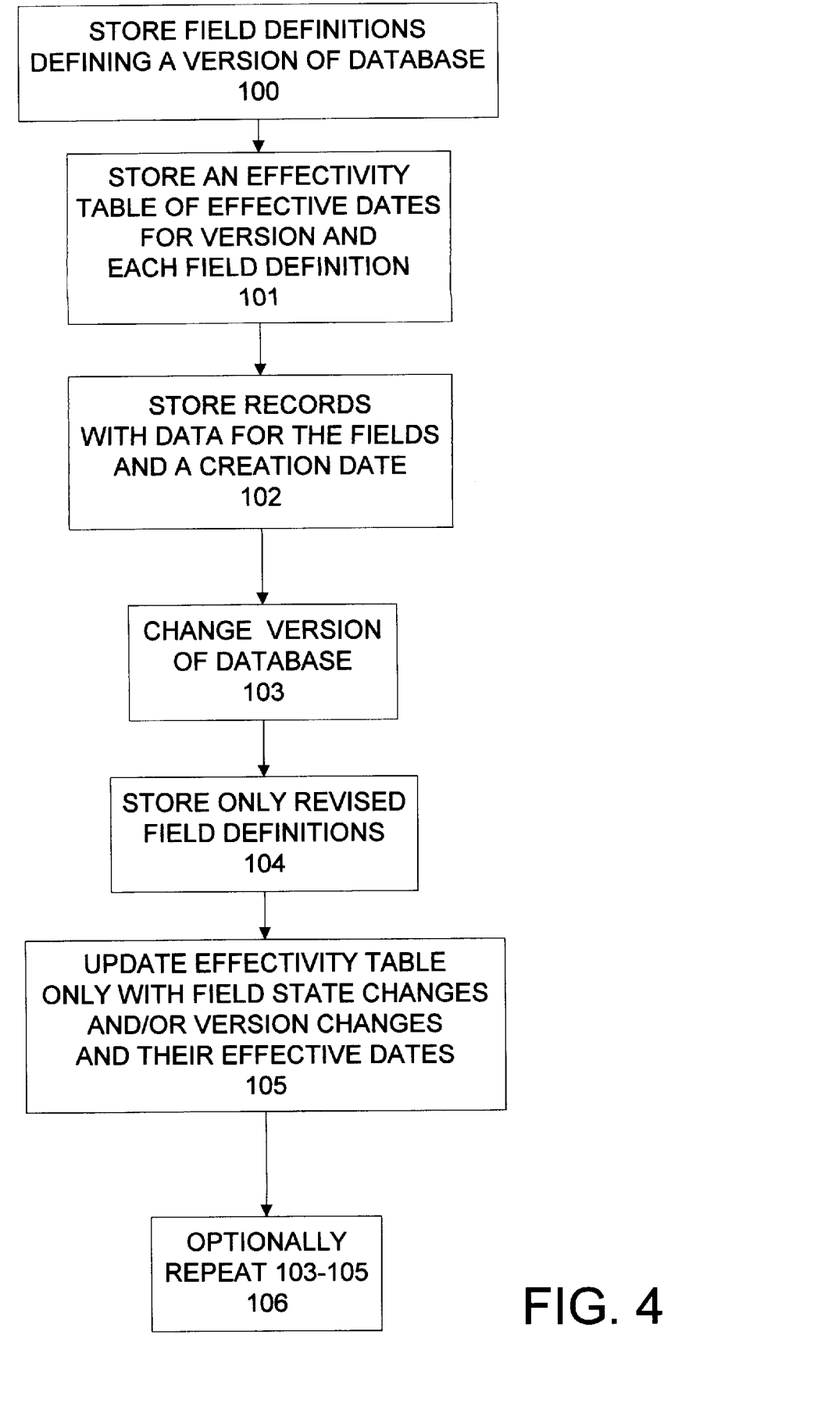
FIGS. 4–7 are flow charts of the method according to the present invention.
Figure 6:
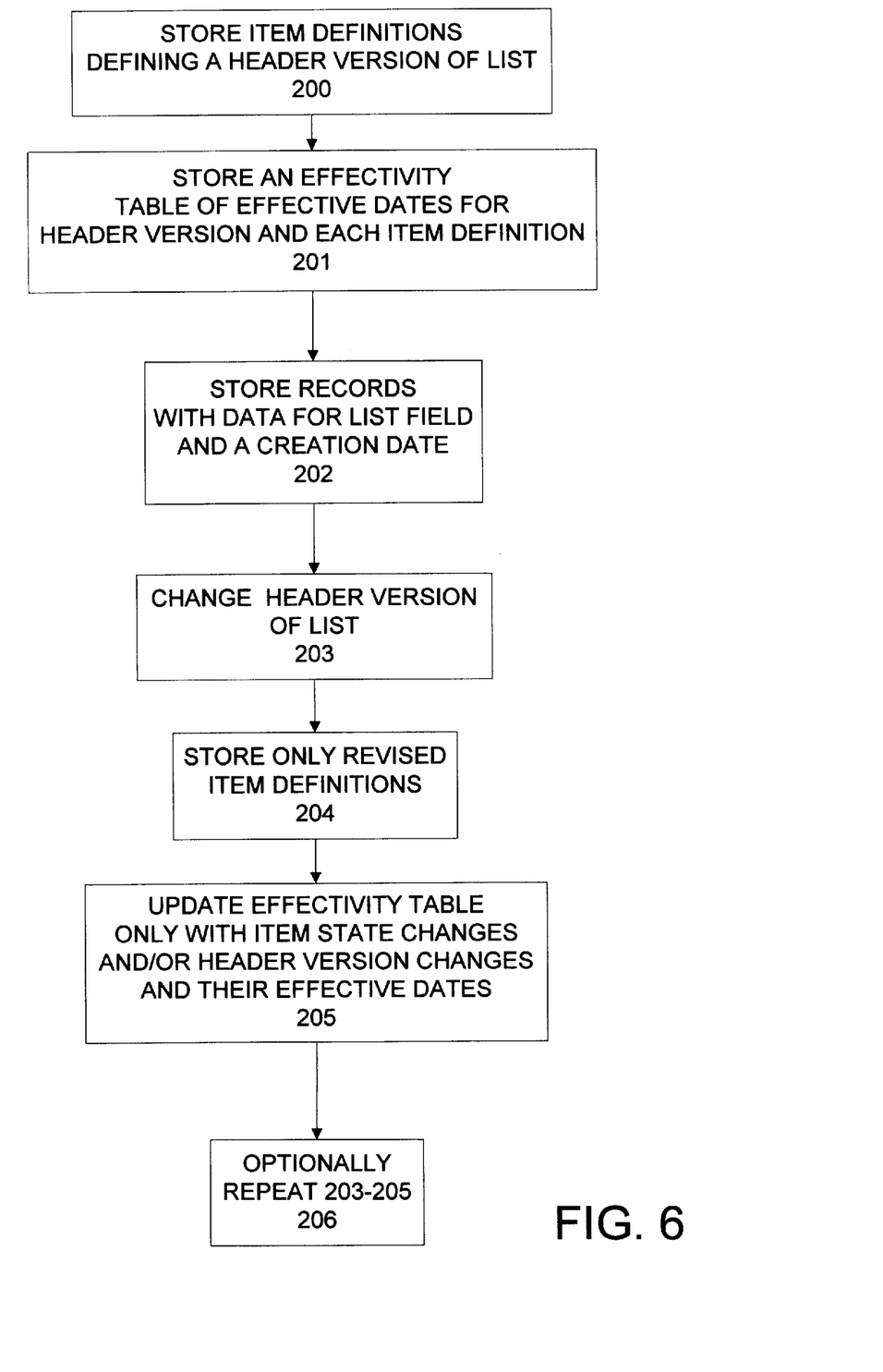

FIGS. 4 and 6 show the steps according to the present invention for defining the various versions of the database and the various headers used for recreating the database.

Although the steps are shown in a particular order, it is understood that the order may be changed and still be able to carry out the method according to the present invention.

As shown in FIG. 4, in 100, the field definitions are stored in the database 11 under the control of the server 10. This defines one version of the database. A descriptor for each field definition and its effective date, as shown in Table II, form an effectivity table stored in database 11 in 101. Thereafter, records are stored with data for the fields along with a creation date in 102. At some point in time, the version of the database is changed in 103. This is done by revising one or more field definitions or returning to an earlier defined version. According to the invention, only the revised field definitions are stored in memory in 104, and the effectivity table is updated to include only changes in the state of the field definitions and/or version changes and their new effective dates in 105.

The storing of records is repeated as desired and the version is optionally changed with the corresponding storage of revised field definitions and updates to the effectivity table in 106.

Figure 3:
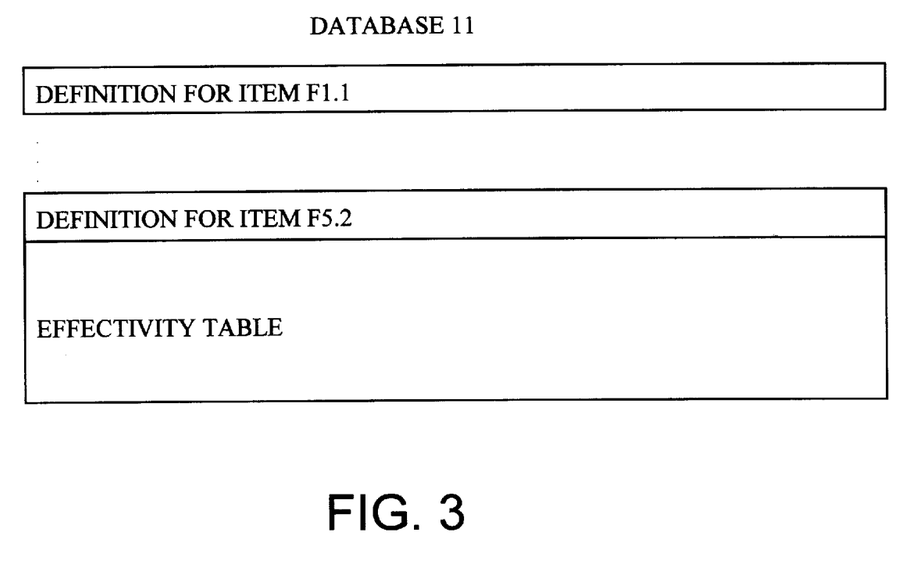
FIG. 3 shows another portion of the database in accordance with the present invention.

In FIG. 6, referring to the database entries in FIG. 3, in 200, the item definitions are stored in the database 11 to define a header version of the list. A descriptor for the header version, each item definition and its effective date, as shown in Table IV, form a second effectivity table for each list and is stored in the database 11 in 201. Only new versions of items need to have their effectivity stored, i.e., a new descriptor is created where at least one item in the list does not match any previous version of the list.

Thereafter, records are stored with data for each list field and a creation date in 202. This data is shown in FIG. 2. At a point in time it is desired to change the version of the list in 203 by revising an item definition or returning to an earlier defined version. In accordance with the invention, only the revised item definitions are stored in memory in 204, and the second effectivity table is updated to include only changes in header versions and changes in the state of the item definitions and their effective dates in 205.

The version of the list is optionally changed along with the storing of only revised item definitions and updates to the second effectivity table in 206.

Figure 5:
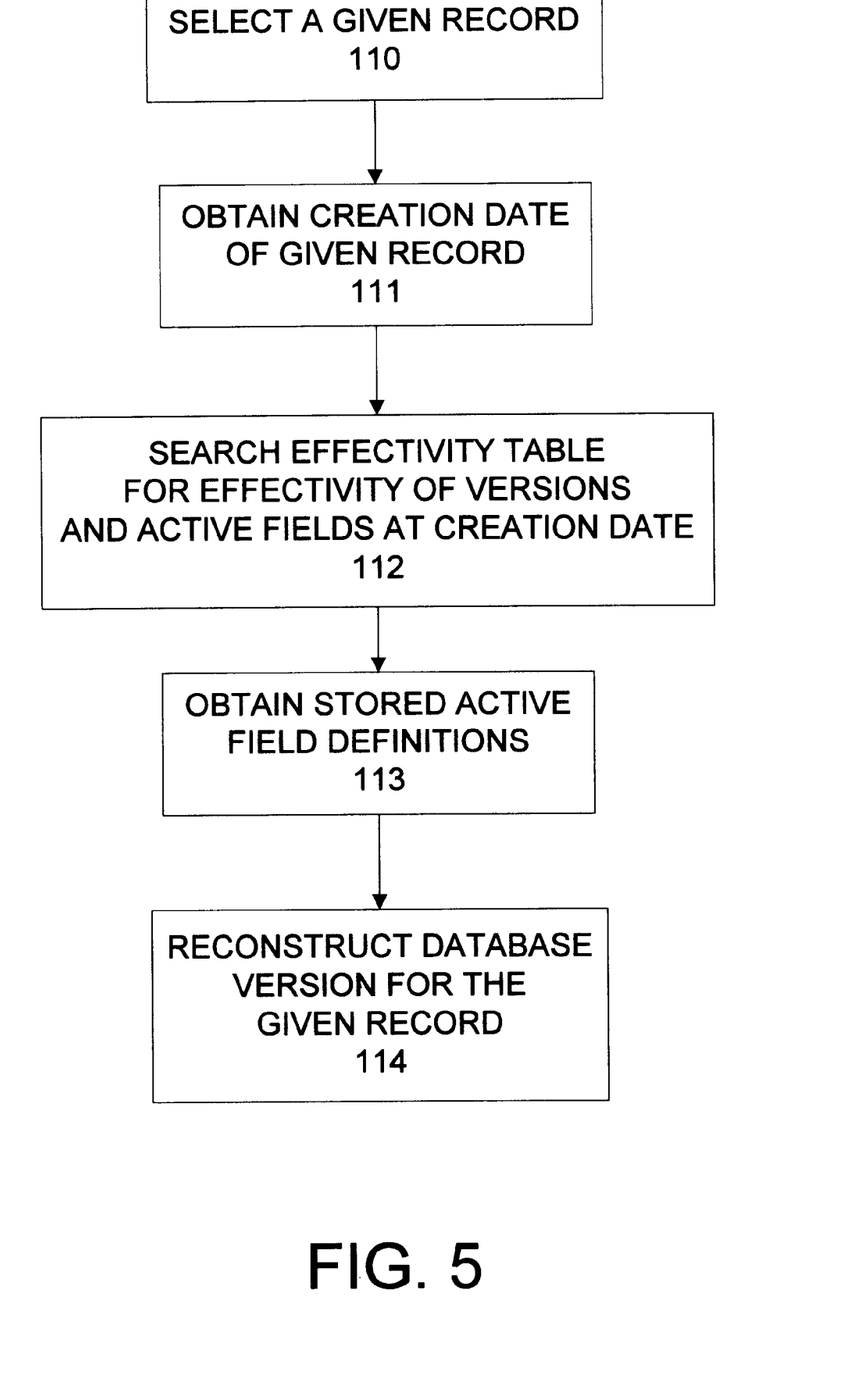
Figure 7:
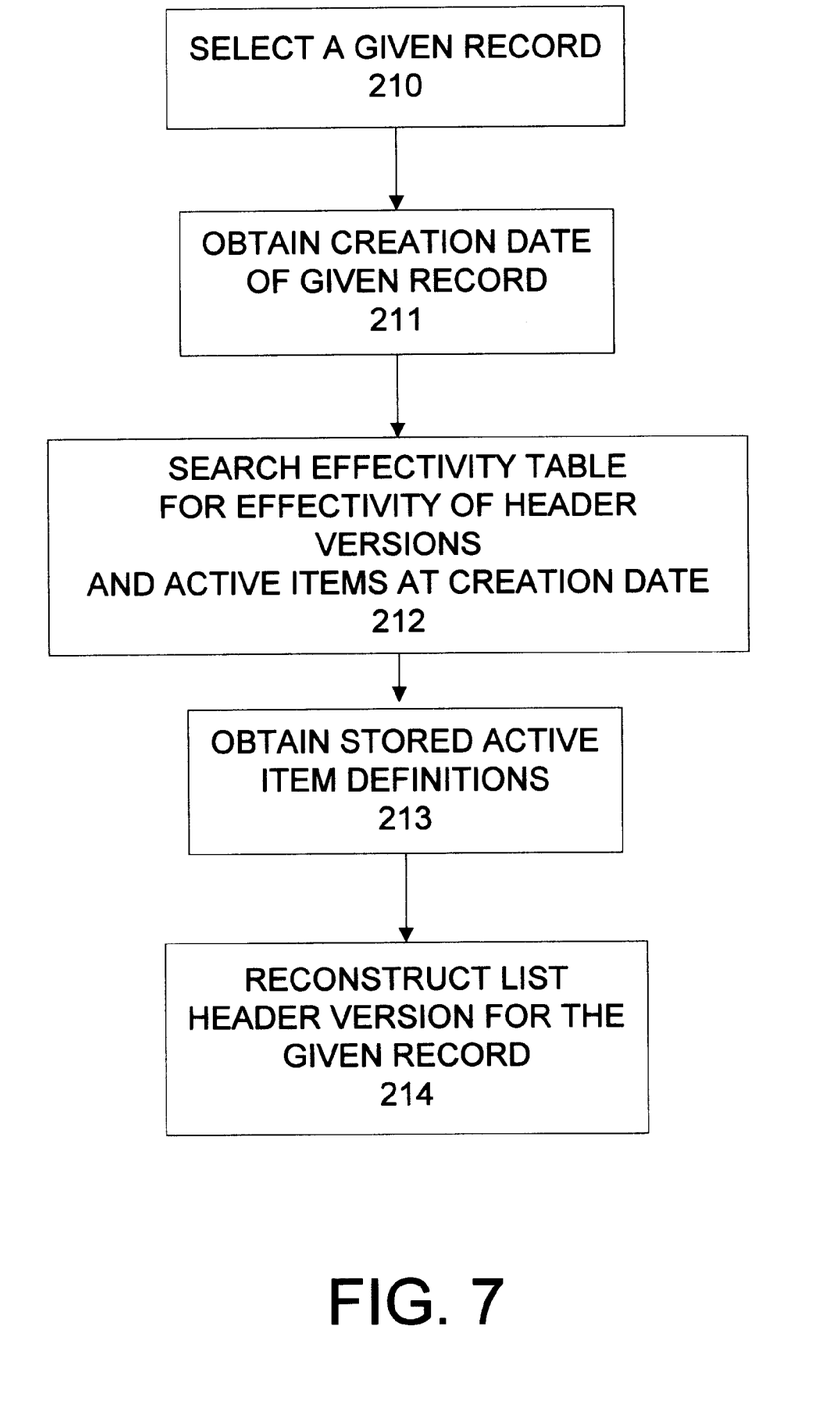

The user of the system is able to recreate the list version for a given record using the method according to the present invention as shown in FIGS. 5 and 7.

If the user selects a given record in 110, the system under the control of the server 10 obtains the creation date of the given record in 111. With this, the effectivity table is then searched and in 112 for the active version and active fields at the creation date. In 113, the system is able to obtain the stored active field definitions identified from the effectivity table. From this, the system is able to reconstruct the database version for the given record in 114 under the control of the server 10.

This would be particularly useful for trying to recreate the format and entries for a particular label that was used in an earlier version of the database. Since even though the active version is used for all new labels created, there are still labels which were created from previous versions of the label definition which must be recognized and interpreted. Thus, in actuality, multiple versions of a definition can be active simultaneously.

Similarly, a version of a list field can be reconstructed for a given record which is selected in 210. The creation date of the given record is obtained in 211, and the effectivity table is searched in 212 for the active header and active items at the creation date. The stored active item definitions for the identified active items are obtained in 213, and the version of the list is reconstructed for the given record in 214, all under the control of the server 10.

It is understood that the embodiments described hereinabove are merely illustrative and are not intended to limit the scope of the invention. It is realized that various changes, alterations, rearrangements and modifications can be made in the acts and steps by those skilled in the art without substantially departing from the spirit and scope of the present invention.

What is claimed is:

1. A method for revision control of a database, comprising the steps of:

a. storing field definitions defining a version of a database;

b. storing an effectivity table including descriptors corresponding to the version and the field definitions and an effective date for each;

c. storing records with data for the fields along with a date when the record was created;

d. changing the version of the database;

e. storing only revised field definitions and updating the stored effectivity table only with at least one of field state changes and version changes and the effective date thereof; and f. repeating the step of storing records and optionally repeating steps d and e.

2. The method according to claim 1, further comprising reconstructing a database version for a given record by obtaining the creation date of the given record;

searching the effectivity table for an active version and for active fields at the creation date; and obtaining the stored active field definitions.

3. The method according to claim 1, wherein the database is a database for a manufacturing execution system.

4. The method according to claim 3, wherein the records comprise support data for a manufacturing execution process.

5. The method according to claim 1, wherein at least one of the fields is a list field comprising a list of items each having a definition and further comprising for each list field:

g. storing item definitions defining a header version of the list field;

h. storing a second effectivity table including descriptors corresponding to the header version and the item definitions and an effective date for each;

i. changing the version of the list field;

j. storing only revised item definitions and updating the stored second effectivity table; and f. optionally repeating steps i and j.

6. The method according to claim 5, wherein the step of updating the second effectivity table comprises updating item state changes and the effective date thereof.

7. The method according to claim 5, wherein the step of updating the second effectivity table comprises updating header version changes and the effective date thereof.

8. The method according to claim 5, further comprising reconstructing a list field version for a given record by obtaining the creation date of the given record;

searching the second effectivity table for an active header version and active items at the creation date; and obtaining the stored active item definitions.

9. The method according to claim 8, further comprising reconstructing a database version for the given record by searching the first effectivity table for an active version and active fields at the creation date; and obtaining the stored active field definitions.

* * * * *